April 9, 1957   G. L. HARKNESS   2,788,137
LOADING AND UNLOADING DEVICES FOR MOTOR VEHICLES
Filed Dec. 17, 1954   2 Sheets-Sheet 1
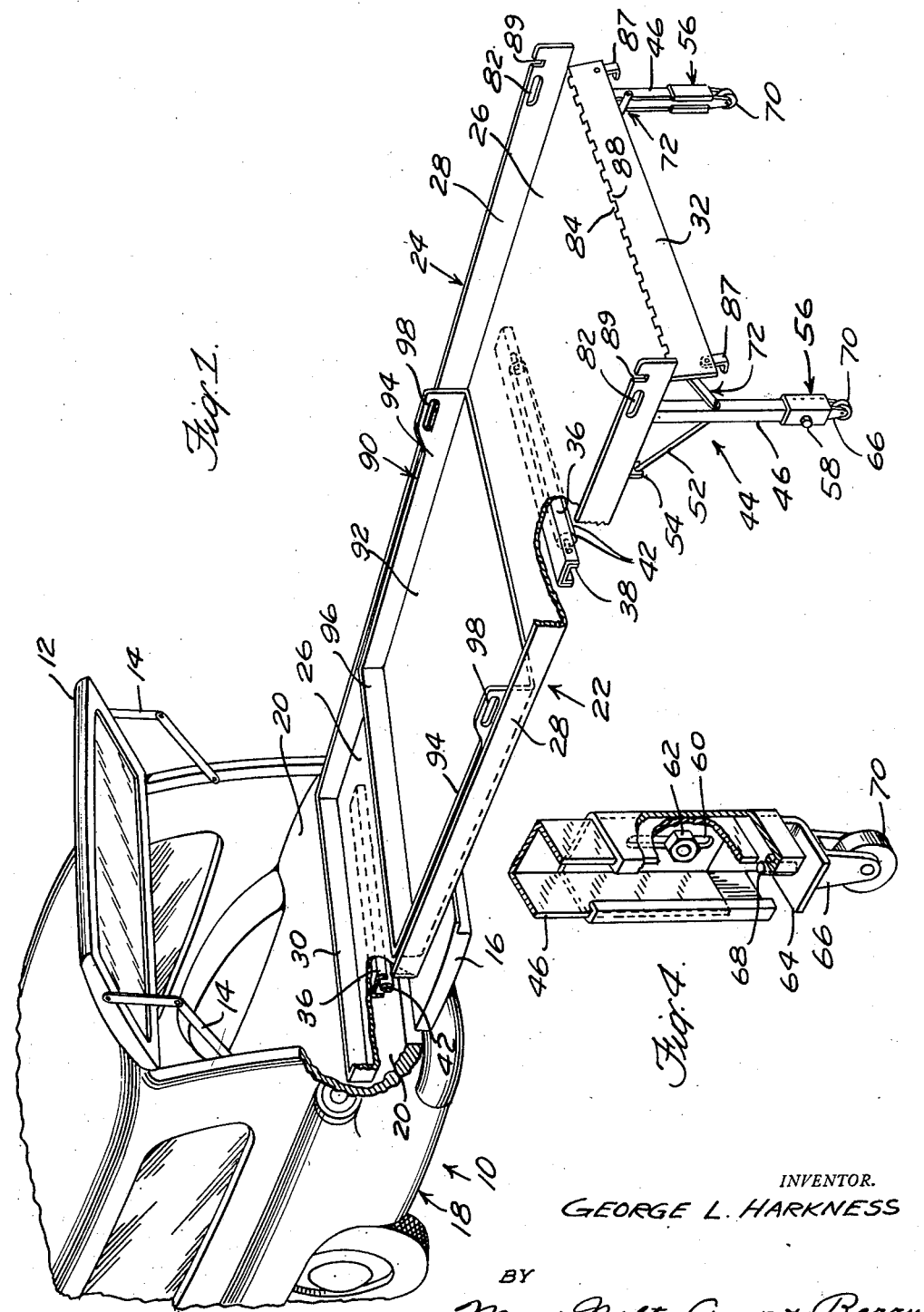
INVENTOR.
GEORGE L. HARKNESS
BY
Moses, Nolte, Crews + Berry
ATTORNEYS April 9, 1957 G. L. HARKNESS 2,788,137
LOADING AND UNLOADING DEVICES FOR MOTOR VEHICLES
Filed Dec. 17, 1954 2 Sheets-Sheet 2
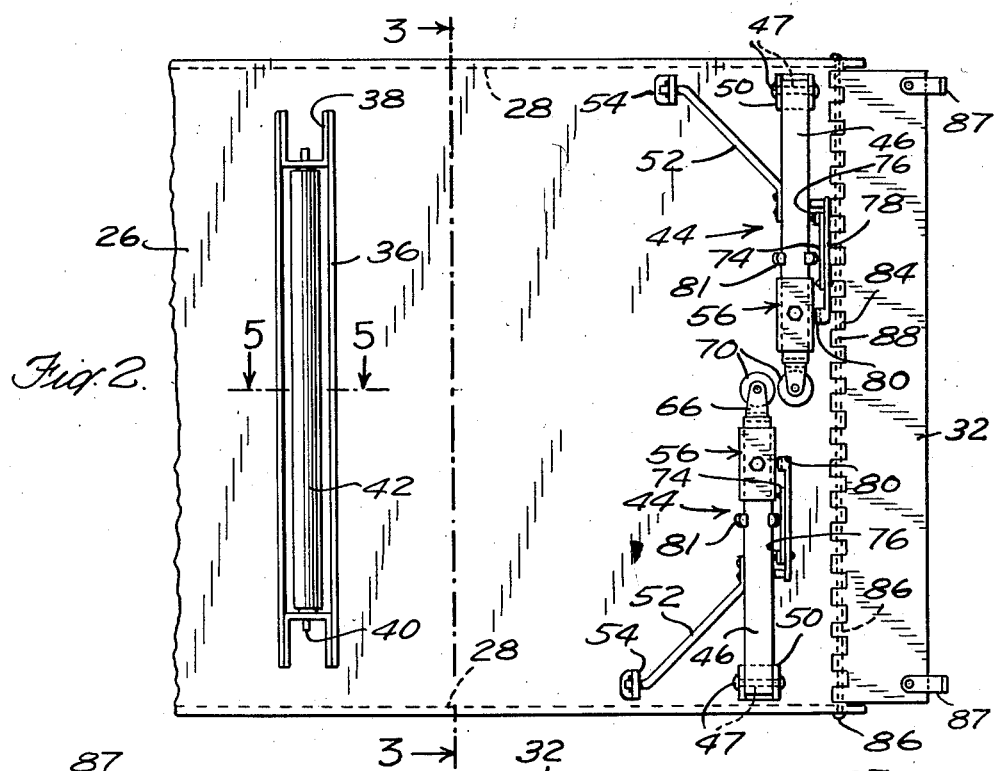
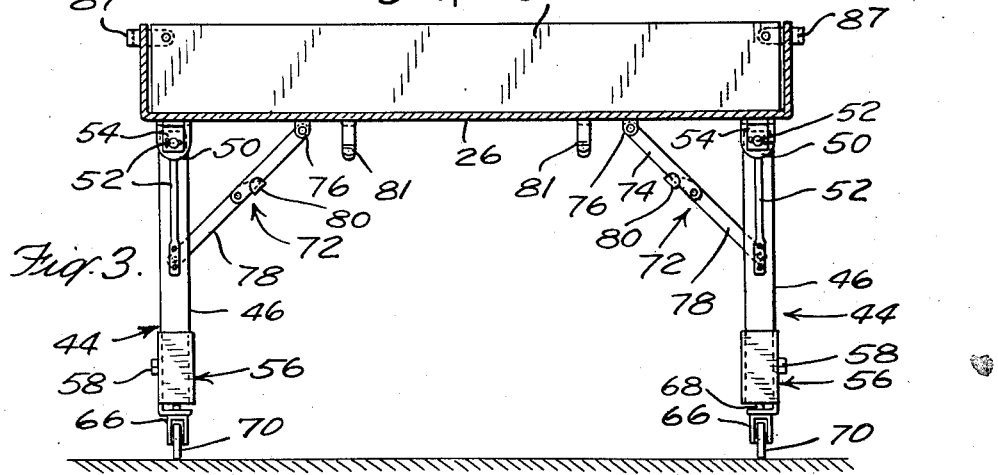
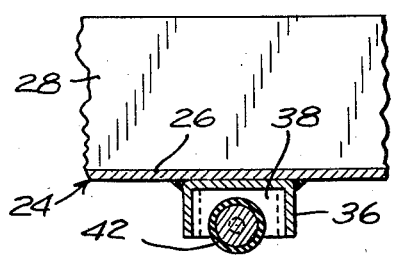
INVENTOR.
GEORGE L. HARKNESS
BY
Moss, Nolte, Crews & Berry
ATTORNEYS United States Patent Office 2,788,137
Patented Apr. 9, 1957

2,788,137
LOADING AND UNLOADING DEVICES FOR MOTOR VEHICLES

George L. Harkness, Oceanside, N. Y.

Application December 17, 1954, Serial No. 475,950

10 Claims. (Cl. 214—83.24)

This invention relates to loading and unloading devices for use with motor vehicles, more particularly for use with station wagons and panel trucks. In station wagons and panel trucks a considerable portion of the load is likely to be disposed well forward where it is rendered wholly inaccessible by other portions of the load. In any event, the forward portion of the load cannot be reached from outside the rear end of the vehicle, so that the operator is likely to be required to climb in and out through the rear end again and again. There is so little headroom within the vehicle that the operator cannot stand erect but is required to maintain a stooping or squatting position when on his feet in the rear of the vehicle.

Loading and unloading devices for use in conjunction with the rear decks or storage compartments of coupés have been proposed which enable the operator to load the forward and relatively inaccessible area of a trunk. So far as I am aware, however, all such previous devices have been complicated and expensive in construction, involving fixed guides, braces, and operating mechanism which are expensive, and which consume and make unavailable a considerable part of the limited and valuable storage space which would otherwise be available.

Accessories in the form of trunk-carried trailers have also been proposed for enlarging the carrying capacity, but these devices are not adapted for the service to which the present device is to be put. Besides being unsightly and exposing the load to the weather when in use, these trailer devices are necessarily of expensive construction because they must be very sturdy, and because they involve guides, braces and operating mechanism. They carry the load without the protection against road shocks which the vehicle springs would afford. Such accessories obstruct access to the trunk or vehicle body when in operative position, and occupy the trunk space when not in operative position almost to the exclusion of everything else.

It is a primary object of the present invention to provide a flat loading and unloading device of the utmost simplicity and economy of manufacture, which can be rolled partway out of the vehicle and supported in a level position for loading and unloading, and can be rolled into the vehicle for carrying the load into the vehicle and housing the load under cover and in good order.

It is an important feature of the invention that the device involves no material modification of the vehicle itself, and that it is completely and readily removable from the vehicle so that the vehicle may be left free to be used for purposes, such as passenger service, with which the device would interfere.

It is a further important feature that the device itself is light in weight and consumes very little of the available space within the vehicle. When removed from the vehicle it can be conveniently handled and conveniently stored.

Most desirably, the device comprises inner and outer trays, the inner tray being of less length than the outer one and slidable therein, but being wide enough to completely fill the width of the outer tray so that no space is wasted and no special guiding devices are required other than the side walls of the trays themselves.

It is an important feature of the invention that the principal or outer tray includes small supporting rollers at its underside disposed near one end and intermediate the ends, and legs which may be extended to support the tray from the ground or folded underneath the tray to provide support for the rear end of the tray within the vehicle in substantially the same plane as the bottoms of the rollers.

It is a desirable point that the rollers are made broad enough to extend substantially from side to side of the outer tray, because this avoids the possible catching of the rollers in wells or recesses which are provided in the rear decks of station wagons, enabling one standard roller construction to be used for station wagons of various makes and models.

It is a feature that the foldable legs are made adjustable in length, so that the device can be adapted to vehicles having storage decks at different distances above the ground.

Other objects and advantages will hereinafter appear.

In the drawing forming part of this specification,

Figure 1 is a fragmentary perspective view, partly cut away, of a station wagon and loading device, the latter having its principal or outer tray fully extended and supported from the ground and its inner tray in an intermediate position;

Figure 2 is a fragmentary bottom plan view showing the rear end of the loading and unloading device with the legs folded;

Figure 3 is a vertical transverse sectional view, taken on the line 3—3 of Figure 2, looking in the direction of the arrows, but with the tail gate of the tray up;

Figure 4 is a fragmentary detail sectional view, partly broken away, and on a larger scale than the preceding figures, showing the adjustable construction of one of the legs; and Figure 5 is an enlarged fragmentary sectional detail view taken on line 5—5 of Figure 2.

The vehicle 10 which is illustrated is a typical Ford station wagon. It comprises a rear window panel 12 which is hingedly supported along its upper boundary. The usual toggles 14 are provided for supporting the panel 12 in the raised position illustrated. The vehicle also includes a hinged tail gate 16 which is shown in the open or down position. The body 18 of the vehicle includes a rear deck 20 upon which articles or materials of various kinds may be carried. The deck 20 extends forward out of reach from the rear end. When the deck is fully loaded a considerable part of the load is out of reach from the rear and is rendered inaccessible by other parts of the load. In accordance with the present invention the inconvenience of loading and unloading the less accessible portion of the deck 20 and of having a considerable part of the load buried and beyond reach of the operator are avoided by providing a novel and efficient loading and unloading device 22.

The device 22 comprises an outer tray 24 which includes a floor 26, side walls 28, a forward end wall 30, and a hinged tail gate 32. The body of the tray 24 and the tail gate 32 are desirably formed of sheet aluminum, this material having the advantage of lightness, weather resistance, and economy of cost. The floor 26 is desirably reinforced from below in any suitable manner, for example, by plywood or by suitable aluminum channel members or embossed members of sheet aluminum. The extent and character of the reinforcement is optional. The desiderata of strength and lightness are to some extent in conflict with one another. Different styles or designs may be contrived for heavy duty and for light duty, the former being more heavily reinforced than the latter.

Beneath the floor 26, near the forward end of the tray 24, a downwardly facing transverse reinforcing channel bar 36, desirably of aluminum, is provided, being secured to the floor 26 by spot welding or in any other suitable manner. In the ends of the bar 36 there are secured by riveting, welding or in any other suitable way, U-shaped bearing fixtures 38. The bearing fixtures 38 rotatably support bearing portions 40 of light, rubber faced rollers 42. The rollers 42 are supported far enough down in the bearing fixtures 38 to cause them to protrude downward beyond the lower edges of the channel members 36 and the bearing fixtures 38. At least one additional reinforcing channel bar 36 with bearing brackets 38 and a roller 42 is provided intermediate the ends of the tray 24. The rollers 42 are designed to have rolling engagement with the vehicle deck. They enable the tray to be easily rolled into and out of the vehicle body, without rubbing the deck or subjecting it to rapid wear. The rollers are made of small diameter in order to avoid adding unnecessary height to the combined roller and tray structure. Although they extend near to the lateral boundaries of the tray it is a point that they are confined within such lateral boundaries. Because the rollers are broad, they have sufficient lateral extent and sufficient continuity to ride over wells or other recesses and gaps in the deck surface while maintaining opposite sides of the tray equidistant from the deck. The rollers do not sink down into the wells and then obstruct movement at the well boundaries. Although the rollers roll smoothly along the deck in a fore and aft direction, they frictionally resist transverse motion of the tray, constraining the tray to move in unison with the vehicle when the vehicle turns.

The tray 24 is shown supported from the road at its rear end by a pair of foldable legs 44. Each leg 44 comprises a channel-shaped upper or body member 46 whose upper end fits between, and is pivotally connected through, a pivot pin 47 to downwardly reaching arms 48 of a U-shaped bearing bracket 50. A brace rod 52 is rigidly connected at one end to an intermediate portion of the member 46, and has its opposite end rotatively supported by a bearing bracket 54 in alignment with the pivot pin 47.

Each leg 44 also includes a lower shoe member 56 which is channel-shaped and which telescopically receives the leg member 46. The shoe 56 is slidable along the body member 46, having its side walls folded inward to wrap around the side walls of the member 46. A headed screw 58 has its shank passed through a hole in the shoe 56 and through a longitudinal slot 60 formed in the member 46. A nut 62 may be tightened on the screw 58 to clamp the shoe in fixed relation to the body member 46 of the leg. So long as the device is used with a single vehicle there will be no occasion to re-adjust the leg length. Should the owner wish to use the loading device with a different vehicle, however, the leg length can be readily changed by backing off the nut slightly, re-adjusting the screw relative to the leg member 46, and re-tightening the nut. At its lower end the shoe 56 includes an inturned horizontal portion 64 to which a caster 66 is applied. The caster includes a stem 68 and rotatively supports a roller 70.

Each leg member is limited in its outward movement to a vertical position and is detained against collapsing by a conventional toggle 72. Each toggle 72 comprises an upper link 74 which is pivotally connected to a bracket 76 secured on the lower side of the tray floor 26. A lower link 78 includes a projection 80 which serves as an abutment, a spring detent and a releasing handle for engagement with the link 74. The legs when folded lie in a common plane with the bottoms of the rollers 42, serving to support the rear end of the tray from the rear deck of the vehicle. The legs are retained in folded condition by spring clips 81.

The side walls 28 are formed near their rear ends with slots 82 through which the operator may insert his fingers for securing a good grip on the tray when handling it. Additional slots of similar character may be provided in the side walls 28 for use with straps or elastic bands, not shown. Such straps or bands may be employed for lashing the rear end of the tray securely against sidewise movement, or for interfering with shifting of the load relative to the tray.

The tail gate 32 is hingedly connected to the floor 26 by means of a conventional hinge construction. Fingers 84 of the floor member 26 are wrapped downwardly around a hinge rod 86, and fingers 88 of the tail gate 32 are wrapped rearwardly around the rod 86, the fingers 84 and 88 being interdigitally arranged. Latches 87 are provided for holding the tail gate in raised position. The latches can be swung into, and out of, slots 89 formed in the rear ends of the side walls 28. The tail gate serves as a rear end wall for the tray when retained in raised position. More importantly, however, the tail gate serves to bridge the gap between the tail gate 16 of the vehicle and the floor member 26 when a heavy machine is being loaded onto the tray 24 within the vehicle. It is an important point that the hinged connection between the floor 26 of the tray and the tail gate 32 leaves no substantial gap.

The tray as thus far described is adapted, without more, to serve as a complete loading and unloading accessory of great value. It is a further and very important feature, however, that an inner tray 90 is provided which fits within the outer tray 24 and is slidable longitudinally thereof. The inner tray is also desirably formed of sheet aluminum. It is not required to be of especially strong construction because it fits within and is supported directly against the floor 26 of the outer tray. The inner tray is desirably about one-half as long as the outer tray. It is intended when loaded to be slid to the forward end of the outer tray, so that the rear end of the outer tray can then be fully loaded and the entire available space can be utilized to maximum advantage.

The inner tray comprises a floor portion 92, side walls 94, and a front wall 96. The side walls 94 bear against, but do not bind against, the side walls 28 of the outer tray. The side walls 94 are of substantially the same height as the side walls 28 throughout the major portions of their lengths, but at their rear ends the side walls 94 are provided with slotted hand grip portions 98 which are disposed above the walls 28.

Ordinarily, with unlimited parking space, the outer tray would be fully extended for loading or unloading and would be either pushed progressively into the vehicle as the loading proceeds if the articles are heavy, or would be pushed into the vehicle all at once after completion of the loading if the articles are light. When unloading, the outer tray may be drawn out little by little if heavily loaded, or all at once if lightly loaded.

When parking space is limited, however, the inner tray is very useful, because then the outer tray can be pulled only part way out of the vehicle. When loading under restricted conditions as to parking space, the inner tray is first located in the rear end of the outer tray, is loaded and pushed to the forward end of the outer tray. The loading of the outer tray is then completed and the outer tray is pushed completely into the vehicle. When unloading under conditions of limited parking space, the rear half of the outer tray is first unloaded and the inner tray is then drawn rearward for unloading.

As will be seen, the device facilitates loading, unloading and working of loads while eliminating the necessity for climbing through the rear to reach articles located on the front end of the deck, or of walking around to the front and pushing articles back to within reach of the rear gate. The device reduces the necessity of loading in the reverse order of desired unloading, as in the case of route deliveries. All parts of the load are completely and equally accessible when the device is slid well out of the vehicle. Items may, therefore, be reached indiscriminately from any part of a full load.

The device protects the interior of a station wagon, a point of considerable importance in the case of a station wagon which is used both for business and pleasure. The device may even be used for carrying small loads of unpackaged sand, topsoil, gravel and the like without detriment to the vehicle, and such material may be unloaded easily by using the tray in an inclined position as a chute.

The device can be designed for heavy duty or for light duty. The heavy duty design can be used as a ramp, either with or without block and tackle, for loading heavy machinery.

Because of its discrete character, the device permits a complete loading job to be done indoors if desired, the tray being then carried on a hand truck or cart to the vehicle and rolled into the vehicle in loaded condition. This is especially advantageous in connection with such merchandise as bakery goods. It is also advantageous in connection with exchange loading such as shipments to, and pickups from, converters, printers, etc. This latter use would involve the alternative employment of two or more of the loading and unloading devices in connection with a single vehicle, but in such instances the inner tray would not be used.

The device may also be used for other services in combination with transportation, for example, as a work table for interior decorators or painters, or as a roadside stand for the display and sale of merchandise.

While aluminum has been mentioned as a preferred material for use in constructing the trays, the invention is by no means confined to any specified material. Magnesium and its alloys, wood, plywood, Masonite, plastics and various other materials can be used to advantage wherever their use may be indicated.

I have described what I believe to be the best embodiments of my invention. I do not wish, however, to be confined to the embodiments shown, but what I desire to cover by Letters Patent is set forth in the appended claims.

I claim:

1. A discrete loading and unloading device for use with rear opening, decked motor vehicles comprising, in combination, a tray completely separable from the vehicle, transversely disposed supporting rollers of small diameters carried by the tray at the under side thereof and disposed at forward and intermediate portions of the tray for rolling engagement with the vehicle deck, and foldable legs at the rear end of the tray, the rollers having sufficient lateral spread and sufficient continuity of supporting surface to maintain the opposite sides of the tray equidistant from the deck at all times, even when wells are encountered, and the construction and arrangement being such that the tray can be partially withdrawn from the vehicle by rolling on the vehicle deck and supported on the legs in a fully accessible position for loading and unloading, and can be thrust loaded or unloaded completely into the vehicle for transportation.

2. A discrete loading and unloading device for use with rear opening, decked motor vehicles comprising, in combination, a tray completely separable from the vehicle, long supporting rollers of small diameters carried by the tray at the lower side of the tray and disposed transversely of the tray at forward and intermediate portions thereof, the rollers being confined within the lateral bounds of the tray but having sufficient length and sufficient continuity of supporting surface to avoid obstruction by wells formed in the vehicle deck, and foldable legs at the rear end of the tray, the construction and arrangement being such that the tray can be partially withdrawn from the vehicle by rolling on the vehicle deck and supported in part on the legs in a fully accessible position for loading and unloading, and can be thrust loaded or unloaded completely into the vehicle for transportation.

3. A discrete loading and unloading device for use with rear opening, decked motor vehicles comprising, in combination, a tray completely separable from the vehicle, supporting rollers of small diameters carried by the tray at the lower side of the tray and disposed transversely of the tray at forward and intermediate portions of the tray, and foldable legs at the rear end of the tray, the legs when folded providing support for the tray in a common plane with the bottoms of the rollers, the construction and arrangement being such that the tray can be partially withdrawn from the vehicle and supported substantially level on the vehicle and the unfolded legs for loading and unloading, and can be thrust loaded or unloaded completely into the vehicle with the legs folded out of the way.

4. A discrete loading and unloading device for use with rear opening, decked motor vehicles comprising, in combination, a tray completely separable from the vehicle, supporting rollers of small diameters carried by the tray at the lower side of the tray and disposed transversely of the tray at forward and intermediate portions of the tray, and foldable legs at the rear end of the tray, the legs being adjustable in height, and the construction and arrangement being such that the tray can be partially withdrawn from the vehicle by rolling on the vehicle deck and supported on the vehicle and legs for loading, and can be thrust loaded or unloaded completely into the vehicle with the legs folded out of the way.

5. A discrete loading and unloading device for use with rear opening, decked motor vehicles comprising, in combination, a tray completely separable from the vehicle, supporting rollers of small diameters carried by the tray at the lower side of the tray and disposed transversely of the tray at forward and intermediate portions of the tray, and foldable legs at the rear end of the tray, the legs each including telescoping sections and including means for securing the leg sections in different adjusted relations to one another to change the effective heights of the legs, the construction and arrangement being such that the tray can be partially withdrawn from the vehicle by rolling on the vehicle deck and supported on the vehicle and the legs for loading or unloading, and can be thrust loaded or unloaded completely into the vehicle with the legs folded out of the way.

6. A discrete loading and unloading device for use with rear opening, decked motor vehicles comprising, in combination, a tray completely separable from the vehicle, supporting rollers of small diameters carried by the tray at the lower side of the tray and disposed transversely of the tray at forward and intermediate portions of the tray, the rollers having sufficient lateral spread and sufficient continuity of supporting surface to maintain the opposite sides of the tray equidistant from the deck at all times, even when wells are encountered, and foldable legs at the rear end of the lower side of the tray, said tray including a flat smooth floor, side walls, a front wall, and a tail gate.

7. A discrete loading and unloading device for use with rear opening, decked motor vehicles comprising, in combination, a tray completely separable from the vehicle, supporting rollers of small diameters carried by the tray at the lower side of the tray and disposed transversely of the tray at forward and intermediate portions of the tray, the rollers having sufficient lateral spread and sufficient continuity of supporting surface to maintain the opposite sides of the tray equidistant from the deck at all times, even when wells are encountered, and foldable legs at the rear end of the tray, and casters carried at the lower ends of the legs, said tray including a flat smooth floor, side walls, and a front wall.

8. A discrete loading and unloading device for use with rear opening, decked motor vehicles comprising, in combination, a tray completely separable from the vehicle, supporting rollers of small diameters carried by the tray at the lower side of the tray and disposed transversely of the tray at forward and intermediate portions of the tray, the rollers having sufficient lateral spread and sufficient continuity of supporting surface to maintain the opposite sides of the tray equidistant from the deck at all times, even when wells are encountered, and foldable legs at the rear end of the tray, said tray including a flat smooth floor, side walls, a front wall, and a tail gate, the side walls being formed with slots to facilitate handling of the tray and the lashing of the tray to the vehicle.

9. A discrete loading and unloading device for use with rear opening, decked motor vehicles comprising, in combination, a tray completely separable from the vehicle, supporting rollers of small diameters carried by the tray at the lower side of the tray and disposed transversely of the tray at forward and intermediate portions of the tray, the rollers having sufficient lateral spread and sufficient continuity of supporting surface to maintain the opposite sides of the tray equidistant from the deck at all times, even when wells are encountered, and foldable legs at the rear end of the tray, and a second or auxiliary tray within the first, the auxiliary tray being of substantially less length than the first tray but being wide enought to fit slidingly between the side walls of the first tray.

10. A discrete loading and unloading device for use with rear opening, decked motor vehicles comprising, in combination, a tray completely separable from the vehicle, supporting rollers of small diameters carried by the tray and disposed at forward and intermediate portions of the tray, and foldable legs at the rear end of the tray, said tray including a flat smooth floor, side walls, a front wall, and a tail gate, the side walls being formed with slots to facilitate handling of the tray and the lashing of the tray to the vehicle, and a second tray slidably fitted within the first and having a flat floor, side walls, and a forward end wall, the side walls having hand grip portions at the rear ends thereof.

References Cited in the file of this patent

UNITED STATES PATENTS

| | | |
|---|---|---|
| 1,655,797 | Peck | Jan. 10, 1928 |
| 2,172,405 | Powell | Sept. 12, 1939 |
| 2,284,419 | Greig | May 26, 1942 |
| 2,545,269 | Ford | Mar. 13, 1951 |
| 2,549,018 | Sarlo | Apr. 17, 1951 |
| 2,576,385 | Bigsby | Nov. 27, 1951 |